US011287072B2

(12) United States Patent
Pacheco et al.

(10) Patent No.: US 11,287,072 B2
(45) Date of Patent: Mar. 29, 2022

(54) LIGHTWEIGHT SEALING GASKET FOR LOW PRESSURE AND NON-PRESSURE APPLICATIONS

(71) Applicant: S & B Technical Products, inc., Fort Worth, TX (US)

(72) Inventors: Rodney Pacheco, San Jose (CR); Guido Quesada, San Jose (CR); Mark A. Weih, San Jose (CR); Bernal Rojas, Heredia (CR)

(73) Assignee: S&B Technical Products, Inc., Fort Worth, TX (US)

( * ) Notice: Subject to any disclaimer, the term of this patent is extended or adjusted under 35 U.S.C. 154(b) by 94 days.

(21) Appl. No.: 16/997,359

(22) Filed: Aug. 19, 2020

(65) Prior Publication Data

US 2021/0080042 A1 Mar. 18, 2021

Related U.S. Application Data

(60) Provisional application No. 62/899,253, filed on Sep. 12, 2019.

(51) Int. Cl.
| | |
|---|---|
| *F16L 47/08* | (2006.01) |
| *F16J 15/06* | (2006.01) |
| *F16J 15/08* | (2006.01) |
| *F16L 37/084* | (2006.01) |

(Continued)

(52) U.S. Cl.
CPC ............ *F16L 47/08* (2013.01); *F16J 15/061* (2013.01); *F16J 15/0881* (2013.01); *F16J 15/102* (2013.01); *F16J 15/104* (2013.01); *F16L 17/025* (2013.01); *F16L 37/0845* (2013.01)

(58) Field of Classification Search
CPC ..... F16L 47/08; F16L 17/025; F16L 37/0845; F16J 15/061; F16J 15/0881; F16J 15/102; F16J 15/104
See application file for complete search history.

(56) References Cited

U.S. PATENT DOCUMENTS

| | | | |
|---|---|---|---|
| 9,593,787 B2 * | 3/2017 | Monteil | ................ F16L 37/091 |
| 10,107,427 B2 | 10/2018 | Monteil | |
| 10,393,296 B2 | 8/2019 | Quesada | |

(Continued)

FOREIGN PATENT DOCUMENTS

DE        102007048119 A1      4/2009

*Primary Examiner* — Gilbert Y Lee
(74) *Attorney, Agent, or Firm* — Whitaker Chalk Swindle & Schwartz PLLC; Charles Gunter (57) ABSTRACT

A pipe sealing gasket is shown which is designed to be received within a raceway provided within the female, belled end of a section of plastic pipe which is assembled with a mating male pipe end to form a plastic pipe joint. The gasket is made up of a hard plastic band having an outer circumferential surface and an inner circumferential surface, and two separated elastomer portions. A first of the separated elastomer portions forms an outer ring which circumscribes the outer circumferential surface of the hard plastic band. The second of the separated elastomer portions forms an inner lip which circumscribes the inner circumferential surface of the hard plastic band. The two separate elastomer portions are connected during the gasket molding operation by a series of spaced ribs which form a continuous body of elastomer connecting the first and second separated elastomer portions at spaced intervals.

23 Claims, 11 Drawing Sheets

(51) Int. Cl.
*F16J 15/10* (2006.01)
*F16L 17/025* (2006.01)

(56) References Cited

U.S. PATENT DOCUMENTS

| | | | |
|---|---|---|---|
| 2006/0175765 A1* | 8/2006 | Happel | F16L 21/03 |
| | | | 277/609 |
| 2007/0290455 A1* | 12/2007 | Knapp | B29C 45/1671 |
| | | | 277/627 |
| 2008/0303220 A1 | 12/2008 | Darce et al. | |
| 2014/0374994 A1* | 12/2014 | Monteil | B29C 45/1459 |
| | | | 277/314 |
| 2014/0374995 A1* | 12/2014 | Monteil | F16J 15/166 |
| | | | 277/314 |
| 2015/0204468 A1 | 7/2015 | Jones | |
| 2018/0340642 A1* | 11/2018 | Quesada | F16L 47/08 |

* cited by examiner

LIGHTWEIGHT SEALING GASKET FOR LOW PRESSURE AND NON-PRESSURE APPLICATIONS

CROSS-REFERENCE TO RELATED APPLICATIONS

The present application claims priority to U.S. Provisional Patent Application Ser. No. 62/899,253 filed Sep. 12, 2019, by the same inventors and with the same title.

BACKGROUND OF THE INVENTION

1. Field of the Invention

The present invention relates generally to sealing gaskets and sealing systems used for pipe joints in plastic pipelines in which a male spigot pipe section is installed within a mating female socket pipe section to form a pipe joint and to a method for manufacturing such a gasket having a minimalistic, lightweight design especially suited for low pressure or non-pressure applications such as sewer lines.

2. Description of the Prior Art

Fluid sealing systems for plastic, fluid conveying pipes are used in a variety of industries. The pipes used in such systems are typically formed from thermoplastic materials including polyolefins and PVC. In forming a joint between sections of pipe, the spigot or male pipe end is inserted within the female or socket pipe end. An annular, elastomeric ring or gasket is typically seated within a groove formed in the socket end of the thermoplastic pipe. As the spigot is inserted within the socket, the gasket provides the major seal capacity for the joint. Various types of sealing technologies have been employed to assure the sealing integrity of the pipe joint. It is important that the sealing gasket not be dislodged during the joint make up and that the gasket not become twisted or otherwise compromised in field applications.

Earlier gasketed sealing systems are known in which a homogeneous rubber gasket was generally deformable, allowing it to be flexed or bent by hand, accepting inverse curvature, and inserted within a mating internal raceway formed in the female, belled pipe end. The raceway in the female pipe bell end was pre-formed using a collapsible mandrel belling tool at the pipe manufacturing facility. A prior art attempt to insure the integrity of such pipe joints involved the use of a pipe gasket having a first distinct body region formed of an elastically yieldable sealing material, such as rubber, bonded to a second distinct body region formed of a more rigid material, such as a rigid plastic. The intent was that the rigid body region of the gasket would assist in holding the gasket in place within the pipe groove. Other approaches to the problem included the use of a homogeneous rubber ring with a stiffening band which was inserted into a mating groove provided on the internal diameter of the rubber ring.

In the early 1970's, a new technology was developed by Rieber & Son of Bergen, Norway, referred to in the industry as the "Rieber Joint." The Rieber system employed a combined mould element and sealing ring for sealing a joint between the socket end and spigot end of two cooperating pipes formed from thermoplastic materials. In the Rieber process, an elastomeric gasket was installed within an internal groove in the socket end of the female pipe as the female or belled end was simultaneously being formed. Rather than utilizing a preformed groove, the Rieber process provided a prestressed and anchored elastomeric gasket during the belling operation. Because the gasket was installed simultaneously with the formation of the belled pipe end, a rigid, embedded reinforcing ring could be supplied as a part of the gasket. Because the pipe groove was, in a sense, formed around the gasket with its embedded reinforcing ring, the gasket was securely retained in position and did not tend to twist or flip or otherwise allow impurities to enter the sealing zones of the joint, thus increasing the reliability of the joint and decreasing the risk of leaks or possible failure due to abrasion. The Rieber process is described in the following issued United States patents, among others: U.S. Pat. Nos. 4,120,521; 4,061,459; 4,030,872; 3,965,715; 3,929,958; 3,887,992; 3,884,612; and 3,776,682.

Despite the advances offered by the Rieber process, the belling operation was somewhat complicated and costly. Also, certain situations exist in which it would be desirable to manually install a gasket in the field or at the manufacturing plant, or to remove one gasket and reinstall another within a preformed raceway in the selected pipe end, rather than utilizing an integrally installed gasket in which the groove in the pipe is formed around the gasket. So, in some instances, it may be desirable to have a gasket which can be installed by hand by simply bending and installing the gasket in the pipe raceway.

Accordingly, one object of the present invention is to provide an improved gasket which is securely retained within a preformed pipe groove without the necessity of a separate retaining band.

Another object of the invention is to provide such a sealing gasket with attributes which allow it to seal under low pressure or non-pressure conditions without being twisted or extruded, or displaced during field assembly, and yet which can be installed by hand in the bell raceway of a plastic pipe.

Another object of the invention is to provide an improved sealing gasket of the plastic/rubber variety which optimizes the sealing surface contact of the gasket with the pipe bell raceway and with the spigot end of the joining pipe while minimizing on the amount of the rubber material used. For instance in the case of a PP-TPE gasket, the object would be to minimize the amount of the TPE used while compensating by using more PP.

Another object of the invention is to provide such a sealing gasket of the PP-TPE type which is less than 50% TPE by volume.

SUMMARY OF THE INVENTION

The sealing gaskets of the invention meet the foregoing objectives of a rubber/plastic gasket design which is especially useful in sealing PVC pipes in low pressure or non-pressure applications, such as sewer lines, where its minimalistic lightweight design can be used advantageously. The preferred gaskets of the invention include a ring shaped, hard plastic band made, for example, of a suitable polyolefin, e.g., polypropylene (PP). The hard plastic band supports two separate rubber or thermoplastic elastomer (i.e., TPE, preferably a TPV) sealing regions, the regions making up an outer ring and an inner lip. A main objective of the design is to reduce to the amount of TPV required and to compensate by using more PP instead. In a particularly preferred form, the sealing gaskets of the invention are comprised of approximately 55% PP and 45% TPV by volume. The unique design, which features an outer sealing ring, an inner sealing lip and a sort of plastic cup-like band also inherently achieves the goal of minimizing the total volume of TPV used.

As will be more fully described, a slender PP body supports both TPE components (ring and lip) providing most of the necessary stiffness to develop adequate contact pressure against the sealing surfaces. The outer ring is selectively sized to provide the proper function as a sealing body. The contact pressure on the outer diameter of the sealing gasket during joint make-up comes from the ring compression (due to interference) and from compression and bending of the PP body. The outer ring and inner lip components effectively absorb all joint dimensional variations. In the case of the inner diameter, the main source of contact pressure comes from the circumferential stress of the stretched lip.

There is no a direct compression line from the outer to the inner sealing surfaces through the soft material as in most seals. In the design of the invention, the internal PP bending stress is the means for transmitting the reaction forces through the seal. The gaskets can be easily installed in a pre-formed raceway of a plastic pipe by bending the gasket by hand. The ease of installation and sealing performance can be adjusted by making slight changes in the PP material properties or body geometry to meet requirements and standards. The V-type seal shape promotes self-energizing behavior when hydrostatic pressure is applied A unique molding operation is used to injection mold the sealing gaskets of the invention. The TPV is injected over the PP insert from the seal axis through two gates into the inner lip. The outer TPV ring injection is made through several ribs located on the outer circumferential surface of the seal which are left incorporated into the final product. Once in the final product, these ribs or runners serve as bumpers that help the seal fit laterally into the pipe raceway groove with less material being required.

In a particularly preferred form, a pipe sealing gasket is shown which is designed for receipt within a raceway provided within a female bell socket end of a thermoplastic pipe, the female bell socket end having a given internal diameter which is designed to receive a given outer diameter of a mating male thermoplastic pipe end to form a pipe joint. The gasket is made up of a hard plastic ring-shaped band having an outer circumferential surface and an inner circumferential surface. The band has two separated elastomer portions, a first of the separated elastomer portions forming an outer ring which circumscribes the outer circumferential surface of the hard plastic band, and a second of the separated elastomer portions forming an inner lip which circumscribes the inner circumferential surface of the hard plastic band. The two separate elastomer portions are connected by a series of spaced ribs which form a continuous body of elastomer connecting the first and second separated elastomer portions at spaced intervals around the band.

The hard plastic ring shaped body portion, together with the supported outer elastomer ring portion and inner elastomer lip portion form a V-shaped profile in cross section, the V-shape itself acting to promote a self-energizing behavior when hydrostatic pressure is applied to the pipe joint. The hard plastic band supports both the elastomer outer ring and the elastomer inner lip, providing adequate stiffness to develop contact pressure between the outer ring and the raceway of the bell socket end of the pipe and between the inner lip and the mating male pipe end as a pipe joint is being made up.

The elastomer outer ring portion of the preferred gasket of the invention has an outer ring surface which is selectively sized to function as a sealing body, whereby contact pressure with the pipe belled end on the ring outer surface comes from ring bending and compression due to interference with the pipe belled end and from bending of the polyolefin body. As explained, the elastomer outer ring and inner lip portions are selectively sized to absorb any dimensional variation in the pipe male and female members. In other words, the outer ring absorbs variations in the raceway ID. The remaining dimensional variations such as spigot OD, joint misalignment and deflection and belled end ID (affecting joint misalignment) are absorbed by the inner lip. In the case of the elastomer inner lip portion, the main source of contact pressure comes from circumferential stress of the lip being stretched by the mating male pipe end as the pipe joint is made up.

The gaskets of the invention have further unique features which separate them from gaskets of the prior art. The fact that there is no direct compression line from the outer elastomer ring portion to the inner elastomer lip portion of the gasket through soft material, as is the case in most sealing gaskets, is one distinct difference in the gasket design of the invention. The gaskets of the invention rather rely upon internal bending stress of the hard plastic band as the means for transmitting reaction forces through the seal to the outer elastomer ring portion and the inner elastomer lip portion.

A manufacturing method is also shown for forming the pipe sealing gaskets having the characteristics previously described. The steps in the method in simplest form include the steps of:

providing an injection mold having a top half and a bottom half, the bottom half having a rubber mold cavity;

placing a hard plastic band within the rubber mold cavity, the hard plastic band having an inner circumferential surface and an outer circumferential surface;

injecting rubber into the mold so that the rubber flows on both sides of the hard plastic band, thereby creating an outer, raceway sealing surface and an inner spigot sealing surface, the two surfaces being separated from one another except for the presence of a series of spaced ribs located at spaced apart circumferential locations on the hard plastic band which are used to facilitate the flow of rubber over the PP band to form the two separate gasket sealing surfaces.

Additional objects, features and advantages will be apparent in the written description which follows.

DETAILED DESCRIPTION OF THE INVENTION

The invention described herein and the various features and advantageous details thereof are explained more fully with reference to the non-limiting examples which are illustrated in the accompanying drawings and detailed in the following description. Descriptions of well-known components and processes and manufacturing techniques are omitted so as to not unnecessarily obscure the workings of the invention. The examples used herein are intended merely to facilitate an understanding of ways in which the invention herein may be practiced and to further enable those of skill in the art to practice the invention. Accordingly, the examples should not be construed as limiting the scope of the claimed invention.

Figure 1:
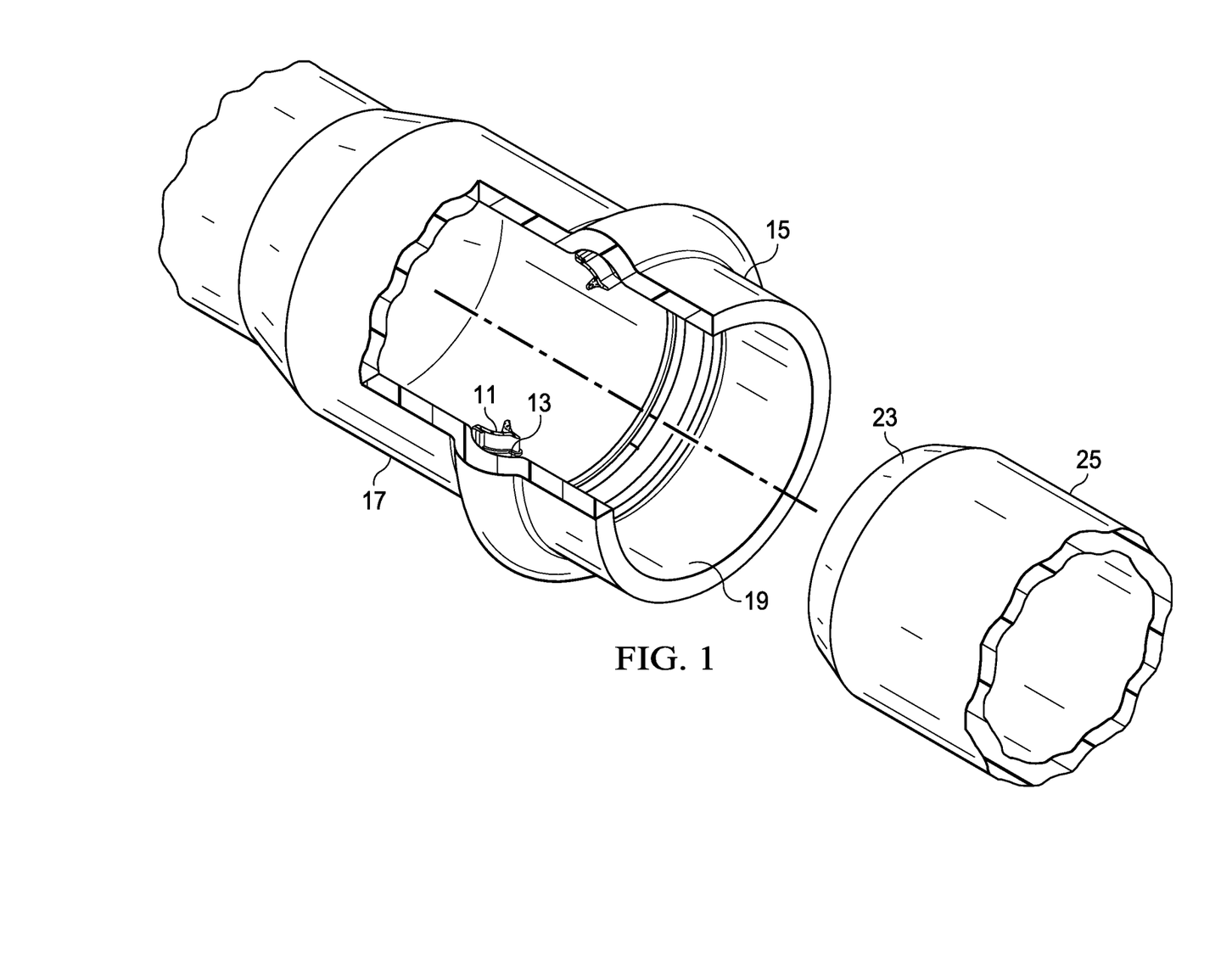
FIG. 1 is an end view of a section of plastic pipe, partly broken away, and showing the bell end and raceway, with a gasket of the invention in place in the raceway, the male pipe section being position for insertion into the bell.

Turning now to FIG. 1, there is shown a pipe sealing gasket 11 which embodies the advantageous features of the invention. The gasket 11 is shown installed within a raceway 13 provided within the belled end 15 of a female pipe section of thermoplastic pipe 17. The female pipe section 17 can be formed of any of a variety of commercially available thermoplastic materials, such as the polyolefin family including polyethylene and polypropylene as well as polyvinyl chloride and similar materials, most typically PVC. Thermoplastic pipes of this general type are used in a variety of industrial settings including water, sewage and chemical industries. The belled end 15 of the thermoplastic pipe section has a mouth opening 19 which is engageable with a spigot end 23 of a mating male pipe section 25 to form a pipe joint. The gasket receiving raceway 13 has been pre-formed in the pipe mouth opening 19 at the pipe manufacturing facility, as by using a collapsible mandrel belling tool. The gasket of the invention is flexible enough to be hand installed in the raceway 13, or by using automated installation equipment.

Figure 6:
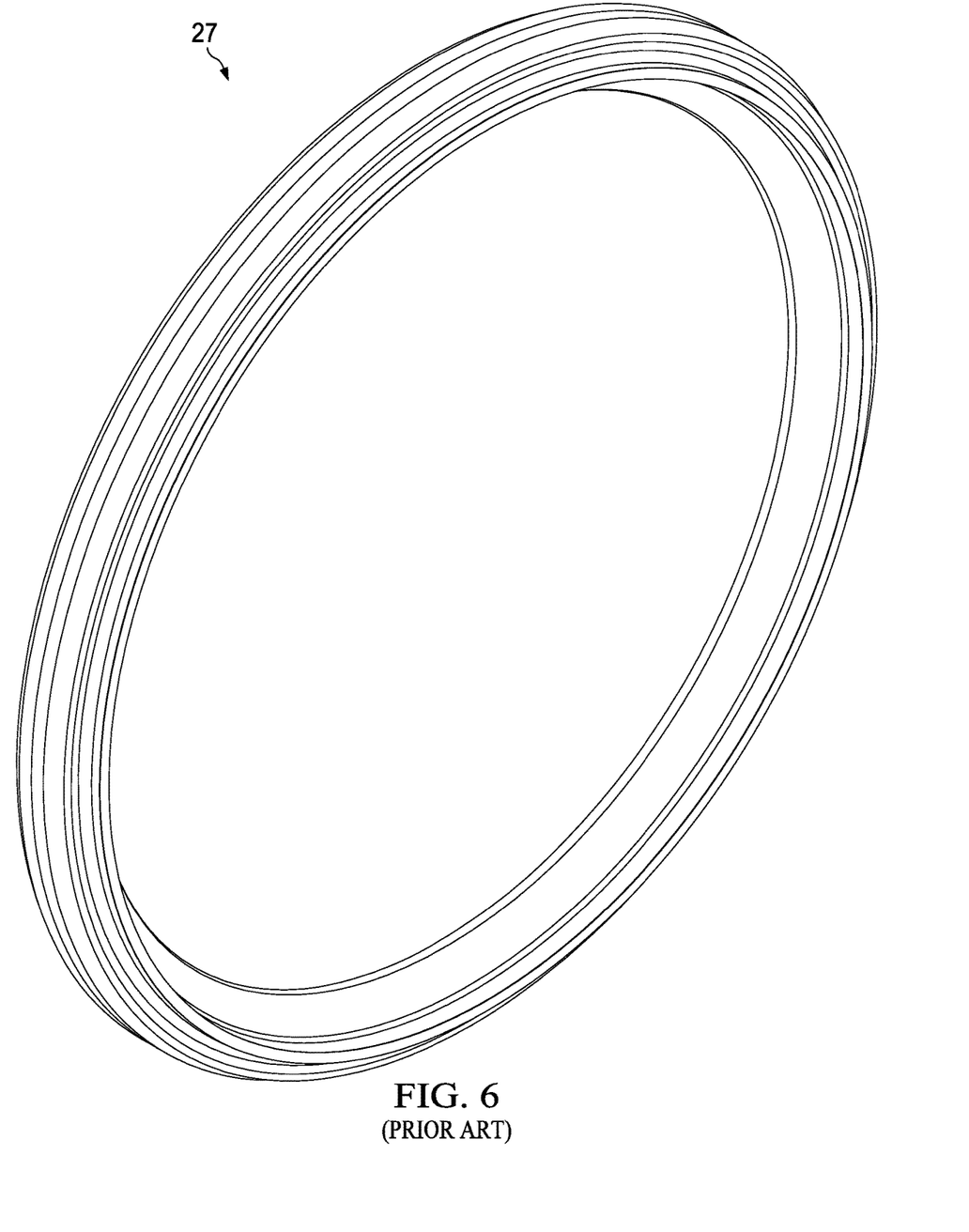
FIG. 6 is a perspective view of a prior art gasket made of a rubber/hard plastic material.
Figure 7:
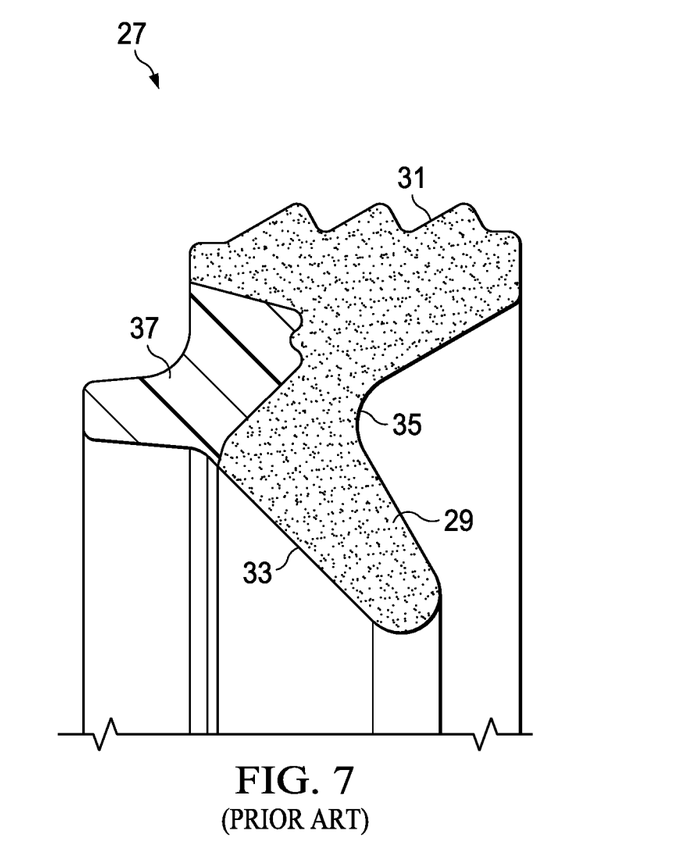
FIG. 7 is a cross sectional view of the prior art gasket of FIG. 6.

Certain of the advantages of the gasket design of the invention can perhaps be best understood with reference to the same general style gaskets of the prior art. FIGS. 6 and 7 show one such typical design, designated generally as 27. The prior art gasket is shown in profile in FIG. 6 and in cross-section in FIG. 7. The gasket 27 can be seen to be an annular, ring-shaped member having a main gasket body 29 formed of a flexible elastomeric material, such as a suitable natural or synthetic rubber. The elastomeric material used to form the body 29 of the gasket will vary in composition depending upon the end application but may encompass a number of different natural and synthetic rubbers including, for example, styrene butadiene rubber (SBR), ethylene propylene diene rubber (EPDM), acrylonitrile-butadiene rubber (NBR), nitrile rubber, etc.

Turning now to FIG. 7, the main gasket body 29 includes an outer sealing surface 31 which, in this case, is provided with a series of ribs or serrations. The main gasket body also includes a lower, primary sealing surface 33. As will be understood by those skilled in the relevant arts, the primary sealing surface 33 is an evenly sloping face of the gasket body which forms a combination lip and compression seal region for the gasket. The lip region is separated from the outer sealing surface 31 by a V-shaped recess (shown generally as 35 in FIG. 7). The V-shaped recess allows the lip region of the gasket body to bend inwardly as the mating male, spigot end of a mating pipe section encounters the primary sealing surface 33 of the gasket.

As is further evident from FIG. 7, the main gasket body 29 of the prior art gasket is reinforced by a hard plastic band 37. The gasket body can thus be thought of as having a rubber element and as having a hard plastic element, the hard plastic element serving as the reinforcing element for the gasket body. Significantly, however, as with typical two-component seals, the inner and outer sealing surfaces 31, 33, from the spigot to the raceway, are part of the same continuous block of rubber or TPV. That is to say the inner sealing surface 33 (against the spigot) is connected to the outer sealing surface 31 (raceway) by a continuous mass of TPV injected in the same mold cavity, where a PP retaining ring is already placed. Extra TPV is used to fill in the space between the two critical and functional contact surfaces of the sealing lip, and raceway. This also necessarily implies that the PP portion of the gasket has to be fairly wide and completely fill in its portion of the mold cavity (in order that it does not distort), creating a wide bonding surface, and using a large volume of PP.

This leads to various complications or limitations which are inherent in the prior art molding techniques. For example, if the PP band was left sticking up in the typical mold cavity to create two separate areas in the mold for the TPV (thereby minimizing the amount of TPV required), the TPV would fill around it and the PP would be distorted by the high pressure TPV as it flowed into the mold cavity. It would be pushed by the high pressure TPV to one side or the other of cavity, depending on the position of the mold gate. There would be no way to create separate sealing surfaces of TPV on the lip and raceway that are interrupted with lower cost PP.

Figure 2:
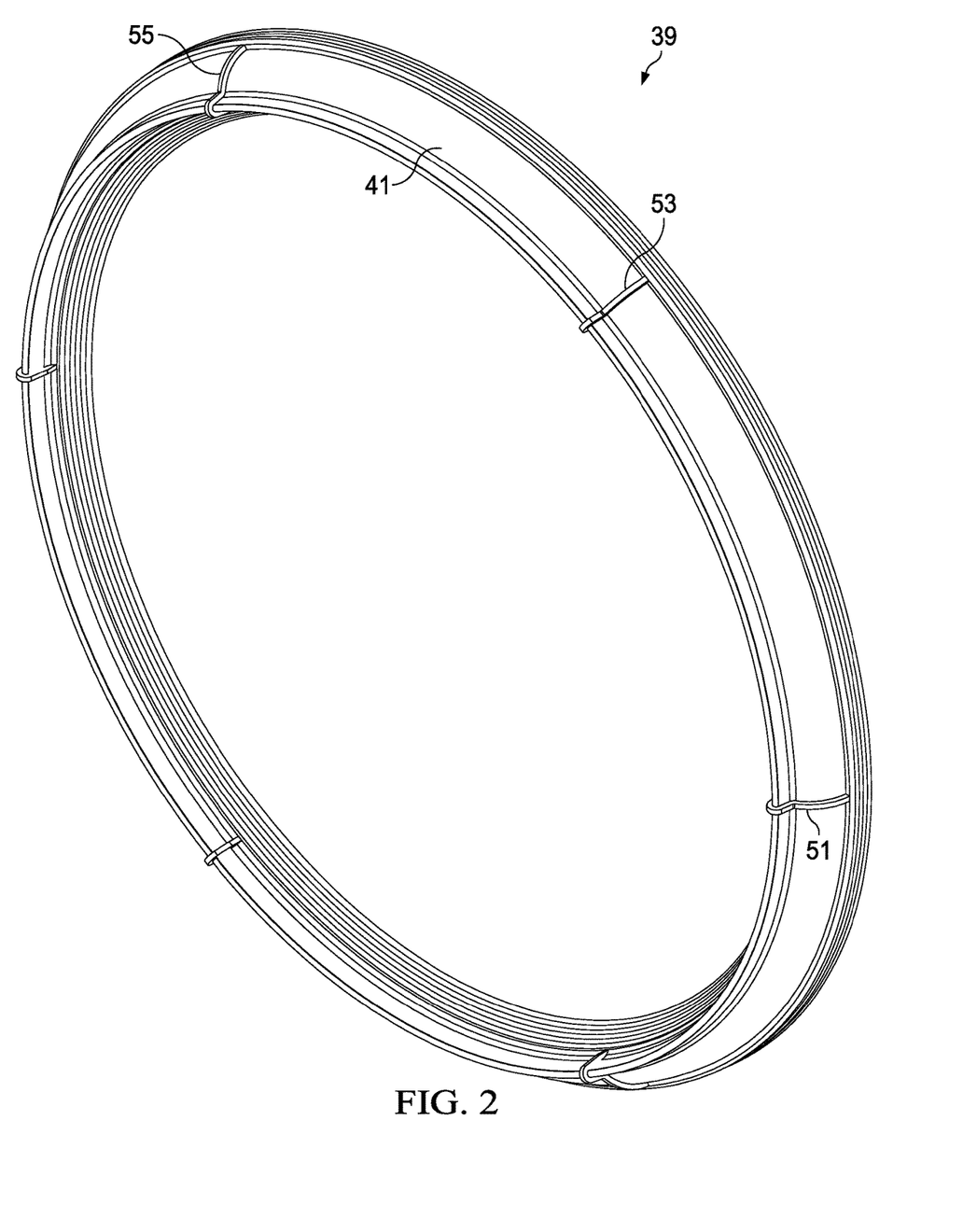
FIG. 2 is a perspective view of the sealing gasket of FIG. 1, showing the ribs which are formed during the manufacturing process and which are an essential part of the unique flow pattern used in injecting the rubber during the manufacturing process.
Figure 3:
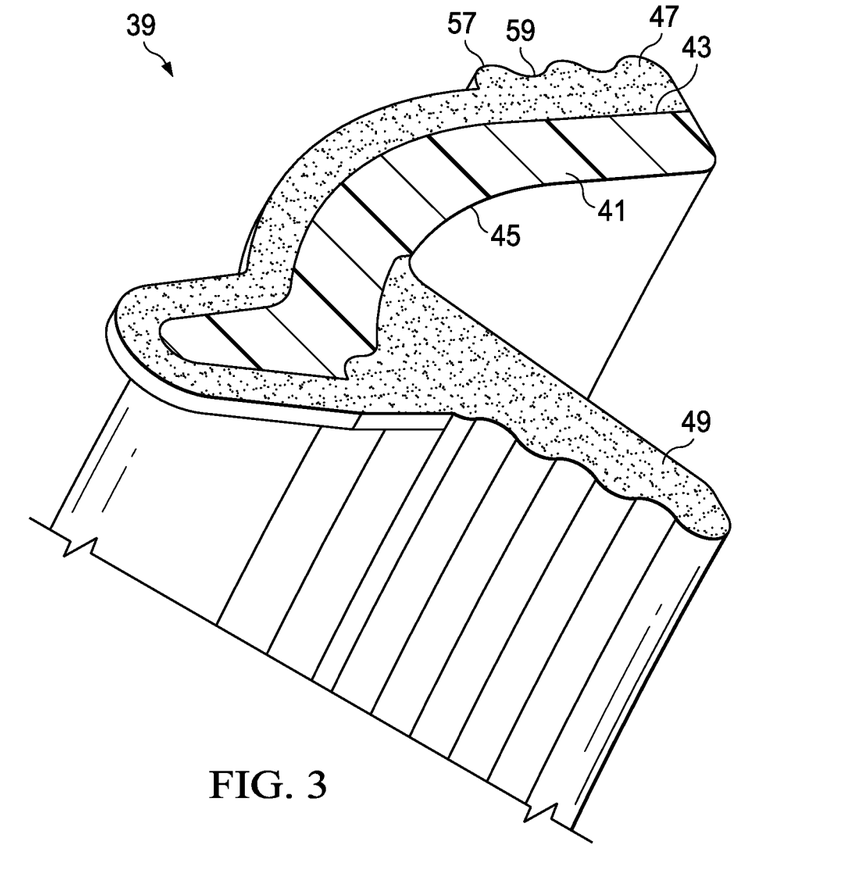
FIG. 3—is a cross-sectional view, of the gasket of the invention, taken at the point of one of the ribs shown in FIG. 2.

With reference now to FIGS. 2 and 3, there is shown an improved sealing gasket of the invention, designated generally as 39. The gasket 39 is intended for receipt within a raceway provided within a female bell socket end of a thermoplastic pipe, the female bell socket end having a given internal diameter which is designed to receive a given outer diameter of a mating male thermoplastic pipe end to form a pipe joint (see FIG. 1). The gasket of the invention can be seen to have a hard plastic ring shaped band 41 having an outer circumferential surface 43 and an inner circumferential surface 45, and two separated elastomer portions 47, 49 (see FIGS. 4A and 4B). A first of the separated elastomer portions 47 forms an outer ring which circumscribes the outer circumferential surface of the hard plastic band, and a second of the separated elastomer portions 49 forming an inner lip which circumscribes the inner circumferential surface of the hard plastic band 41. The two separate elastomer portions 47, 49, are connected by a series of spaced ribs (see, e.g., ribs, 51, 53, 55 in FIG. 2), which form a continuous body of elastomer connecting the first and second separated elastomer portions at spaced intervals.

It will be appreciated that the hard plastic band 41 supports both the elastomer outer ring and the elastomer inner lip (surfaces 47, 49), providing adequate stiffness to develop contact pressure between the outer ring and the raceway (13 in FIG. 1) of the bell socket end of the pipe and between the inner lip and the mating male pipe end.

With reference again to FIGS. 4A and 4B, it can be seen that the elastomer outer ring portion 47 comprises an outer ring surface that is selectively sized to function as a sealing body, whereby contact pressure with the pipe belled end (17 in FIG. 1) on the ring outer surface comes from ring bending and compression due to interference with the pipe belled end and from bending of the polyolefin body, and wherein the elastomer inner lip portion 49 and outer ring portion 47 are sized to absorb any dimensional variation in the pipe male and female members. In the case of the elastomer inner lip portion 49, the main source of contact pressure comes from circumferential stress of the lip being stretched by the mating male pipe end (25 in FIG. 1) as the pipe joint is made up.

Figure 4A:
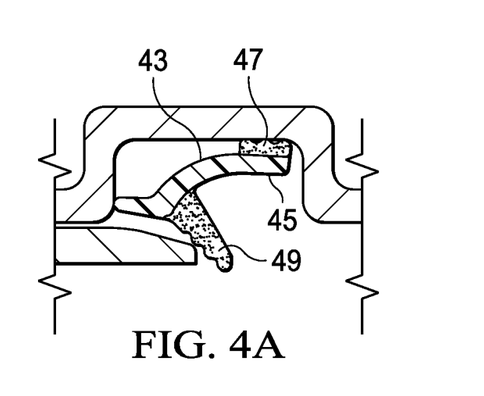
FIG. 4A shows the beginning step of the make-up of a pipe joint with the male pipe end just beginning to make contact with the sealing gasket of FIG. 2.
Figure 4B:
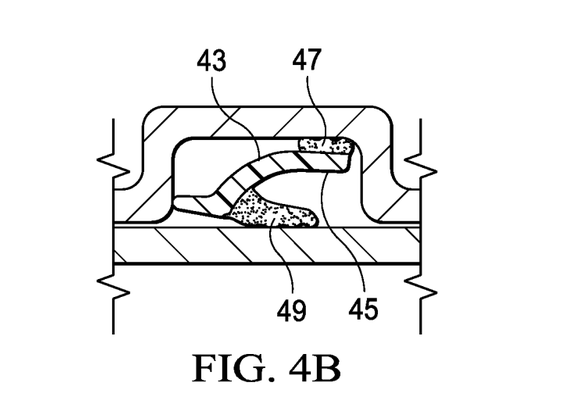
FIG. 4B is a view similar to FIG. 4A, but showing the continued make-up of the pipe joint.

It will also be appreciated from FIGS. 3, 4A and 4B that there is no direct compression line from the outer elastomer ring portion 47 to the inner elastomer lip portion 49 of the gasket through soft material. Rather the internal bending stress of the hard plastic band 41 is the means for transmitting reaction forces through the seal to the outer elastomer ring portion 47 and the inner elastomer lip portion 49. This is to be distinguished from the prior art gasket design shown in FIGS. 6 and 7 where the rubber areas 31, 33 are continuous.

As can be seen in FIG. 3, the hard plastic band 41, together with the supported outer elastomer ring portion 47 and inner elastomer lip portion 49 form a V-shaped profile in cross section, the V-shape itself acting to promote a self-energizing behavior when hydrostatic pressure is applied to the pipe joint. In the particular example of the gasket shown in FIG. 3, both the elastomer outer ring portion and the elastomer inner lip portion of the gasket have exposed circumferential sealing surfaces which are provided with a series of circumferential lands and grooves (e.g., lands 57 and grooves 59) for engaging the female pipe socket end and the mating male pipe as the pipe joint is made up.

As was previously mentioned, the rubber portions of the gaskets of the invention can be formed of a rubber, such as for example, a thermoplastic elastomer such as a thermoplastic vulcanizate, or a more traditional rubber material such as a styrene butadiene rubber, ethylene propylene diene monomer rubber or nitrile rubber. The durometer of the rubber may vary depending on the end application but will typically be in the range from about 40-70 Shore A hardness, preferably about 40-60 Shore A. The hard plastic band 41, on the other hand, is formed of a synthetic plastic material having a durometer which is greater than the durometer of the rubber portions of the gasket. The synthetic plastic material used for the band 41 is preferably a material which shows an appropriate stiffness for the application at hand while allowing flexing during installation.

The preferred material for the rubber portion of the gaskets of the invention are "Thermoplastic Vulcanizates", referred to as TPV's. These materials are part of the thermoplastic elastomer (TPE) family of polymers. However, these materials have the characteristic of being closest in elastomeric properties to EPDM thermoset rubber, combining the characteristics of vulcanized rubber with the processing properties of thermoplastics. TPVs offer a combination of elastomeric properties, such as compression and tension set, coupled with aging performance and chemical resistance. TPV's are typically ready to use in conventional thermoplastic processes such as injection molding and extrusion and does not need to be compounded with different ingredients such as reinforcing fillers (carbon black, mineral fillers), stabilizers, plasticizing oils, and curing systems. Compared to processing rubber, thermoplastic processing of TPV can often deliver shorter cycle times, a higher part output per hour, and the reuse of scrap produced during processing. This can result in part cost reduction, less tooling/machinery, lower scrap costs, and optimization of material logistic costs compared to rubber.

Various hard plastic type materials may be suitable candidates for use as the hard plastic band. These materials include such materials as the polyolefins, such as polypropylene, as well as other materials such as polyvinylchloride and various "engineered plastics." The preferred material for the instant application is a suitable polypropylene. The preferred sealing gaskets are thus a PP-TPV composite.

One advantage of the gasket design of the invention is that less hard plastic is required, thereby resulting in a cost savings. The gaskets of the invention are comprised of greater than 50% synthetic polyolefin. In a particularly preferred form, the gaskets of the invention are, for example, comprised of approximately 55% poly propylene and 45% thermoplastic elastomer by volume.

The sealing gasket design of the invention, which has been described, is only achieved by certain unique techniques used in the molding operation. As has been briefly discussed, there are various complications or limitations which are inherent in the prior art molding techniques. Attempting to create two separate areas in the mold by leaving the PP band sticking up would leave the plastic band subjected to distortion forces caused by the high pressure TPV as it flowed into the mold cavity. There was no convenient way to create separate sealing surfaces of TPV on the lip and raceway contact areas of the gasket that are interrupted with lower cost PP.

The unique molding technique of the invention uses the previously described ribs or runners (51, 53, 55, in FIG. 2) and, more specifically, their mirror image spaces or cavities in the mold to essentially create two cavities in the same mold on either side of the continuous PP band, and use the mold halves to maintain the PP in position. In this way, the TPV can be injected on both sides of the PP band without causing it to distort from the high pressure TPV, as happens with other designs. When the PP band is placed in the mold, and the two halves of the mold are closed, creating two unfilled areas in the mold. One area is on the inside of the PP band, the lip area, and the other is on the outside of the PP band, the raceway area. TPV is injected into the first open cavity and fills this cavity creating the sealing lip. Simultaneously the TPV pushes the PP band against the outside half of the mold, maintaining it in place. The small rib spaces in the outside half of the mold are not wide enough to allow the PP band to be pushed into and fill them, but are wide enough to allow the TPV to flow around the PP, an up the rib spaces (which are grooves in the outside cavity), to the second unfilled cavity. Here, the PP band is held in place by the inside cavity. As the inside cavity fill with TPV, the outside raceway sealing surface is formed, and the PP band is held against the inner mold cavity, so that is does not distort.

By using these techniques, it is possible to use the continuous PP band or ring and have the TPV (or rubber) be separated and used only in the amount needed for the sealing surfaces, without causing any distortion in the PP band. By producing a gasket having two rubber sealing surfaces and by separating the sealing surfaces in this way, the lip seal portion can be used as a lever to rotate the PP continuous band, and help the sealing surface on the raceway side of the PP band to be forced against the outer pipe's raceway, ensuring improved performance in actual field operations.

Figure 5A:
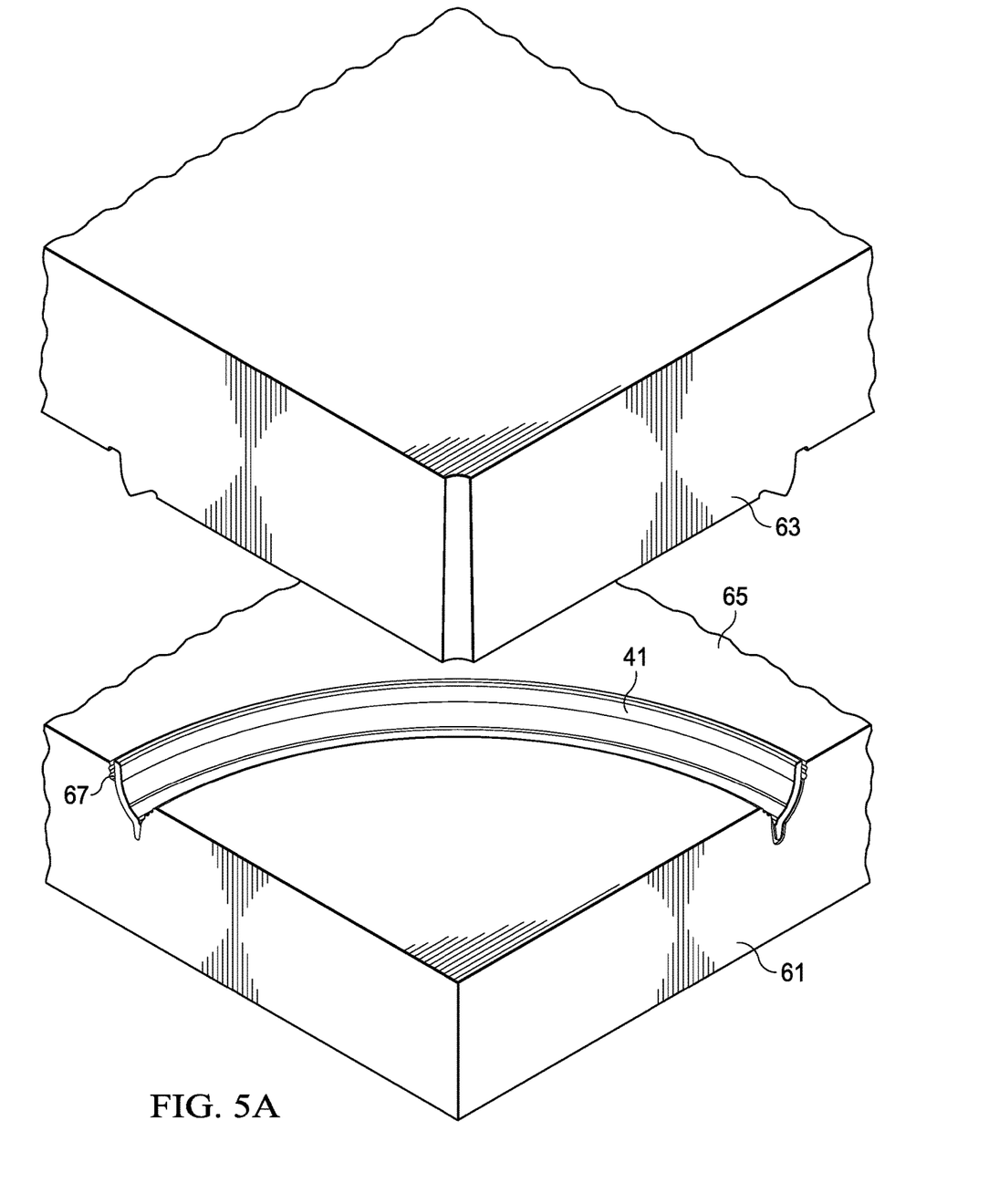
FIG. 5A is a simplified representation of the first step in the process used to manufacture the sealing gasket of the invention, showing the hard plastic band in place in the lower portion of the mold.
Figure 5B:
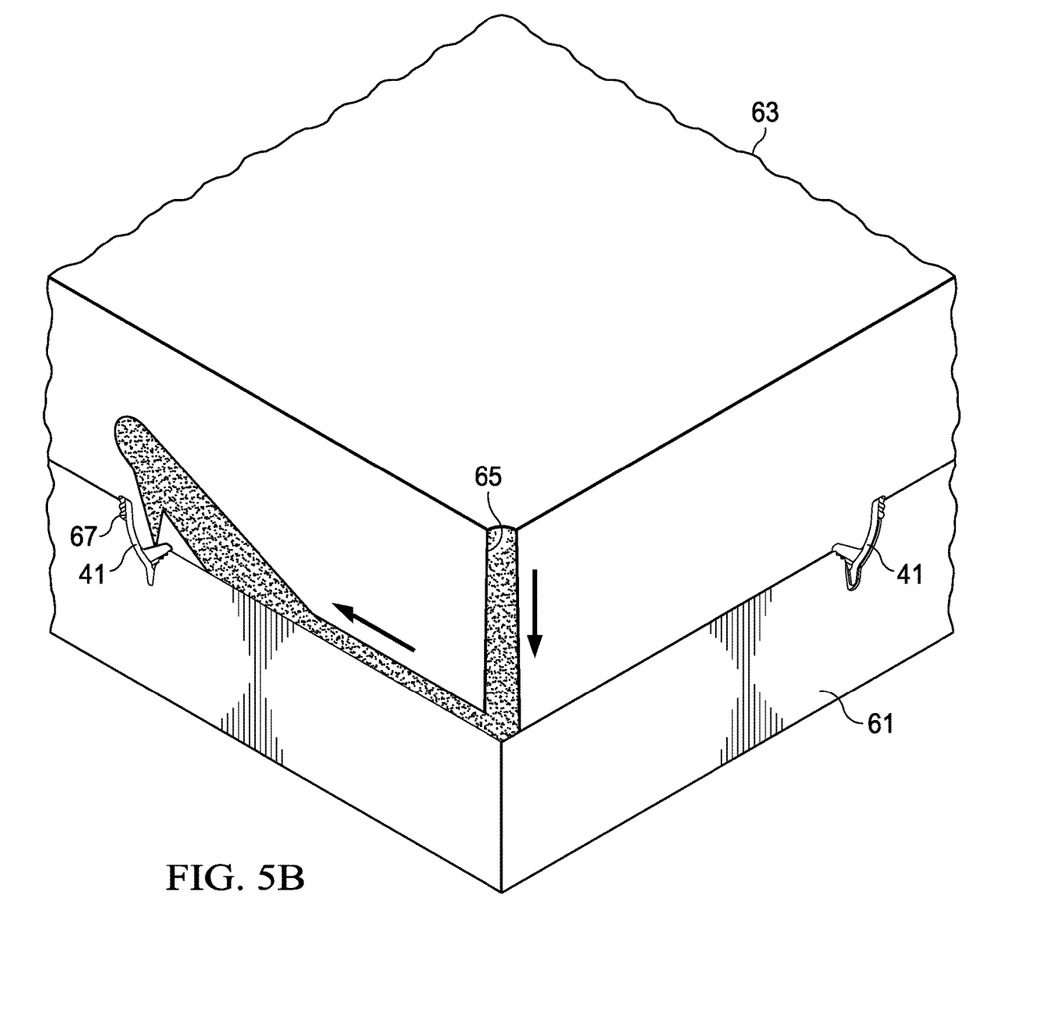
FIG. 5B shows the next step in the manufacturing process in which the top half of the mold is in place and TPV material is being introduced into the mold cavity.

The above method of manufacturing the sealing pipe gasket of the invention will now be described primarily with respect to FIGS. 5A-5F. FIG. 5A shows the lower one half of an injection molding die 61 of the type that will be familiar to those skilled in the relevant arts. The mating upper half of the mold 63 is raised for ease of illustration. As can be seen in FIG. 5A, the first mold half 61 has a first mold face 65 with a circumferential recess 67. As shown in FIG. 5A, in the first step of the manufacturing process, the hard plastic band 41 is placed within the circumferential recess 67.

The second mold half 63 has a mold face which is essentially a mirror image of the first mold face. The first and second mold faces are then united and the moldable rubber compound (in this case a TPV) is injected into the circumferential recess. As has been briefly described, the TPV is injected over the PP insert from the seal axis through two gates into the inner lip region. The outer TPE ring injection is made through the mold areas which end up being the series of ribs or runners that go around the front of the seal area and are left incorporated into the final product. Once in the final product, these runners serve as bumpers that help the seal fit laterally into raceway groove of the plastic pipe with less material being required than with the gaskets of the prior art. In the known manner, heat and pressure are applied to the mold to form a ring gasket body. The heat and pressure in the mold cures the rubber sealing areas and adheres them to the hard plastic band portion.

FIGS. 5B-5E are simplified, partly schematic illustrations of the steps in the molding operation showing the flow path of the TPV (rubber) relative to the hard plastic band 41. In the first part of the manufacturing operation shown in FIG. 5B, the rubber is flowed through the gate 65 from the rubber source (not shown) through the cavity between the mold halves to the lip region 67 of the hard plastic band (insert).

Figure 5C:
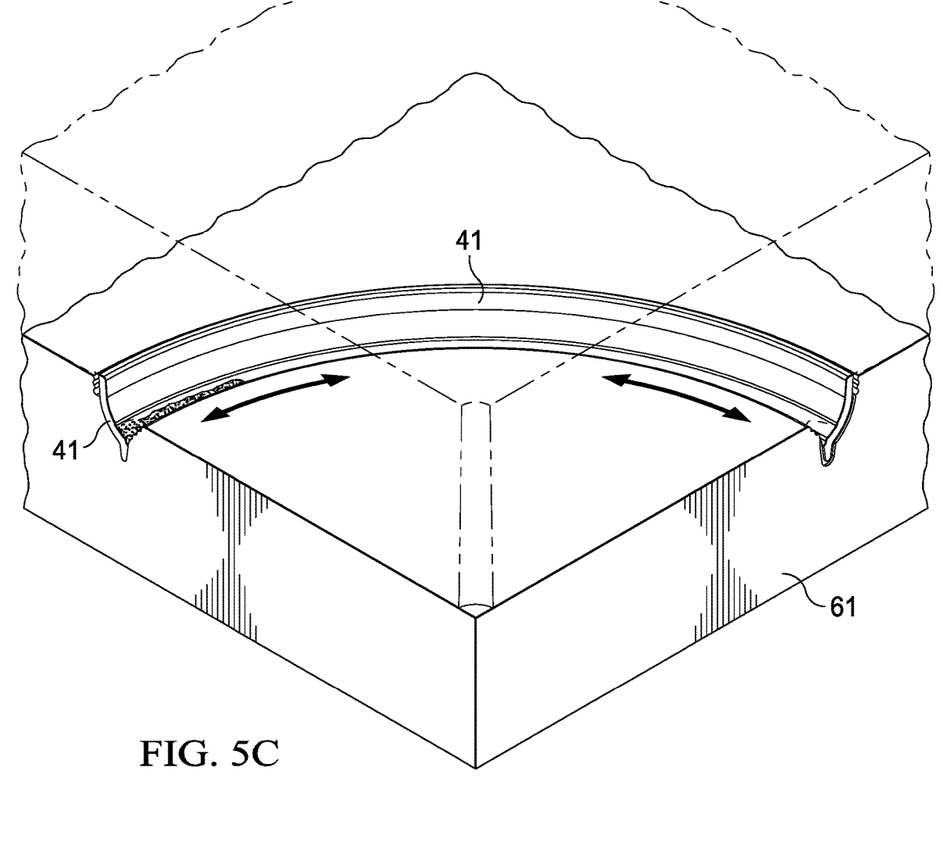
FIG. 5C show the mold cavity with portions of the top half of the mold shown broken away and showing the initial direction of flow of the TPV material through the mold cavity.

As shown in FIG. 5C, the rubber then travels circumferentially in two directions (illustrated by the arrows in FIG. 5C) around the lip cavity of the mold.

Figure 5D:
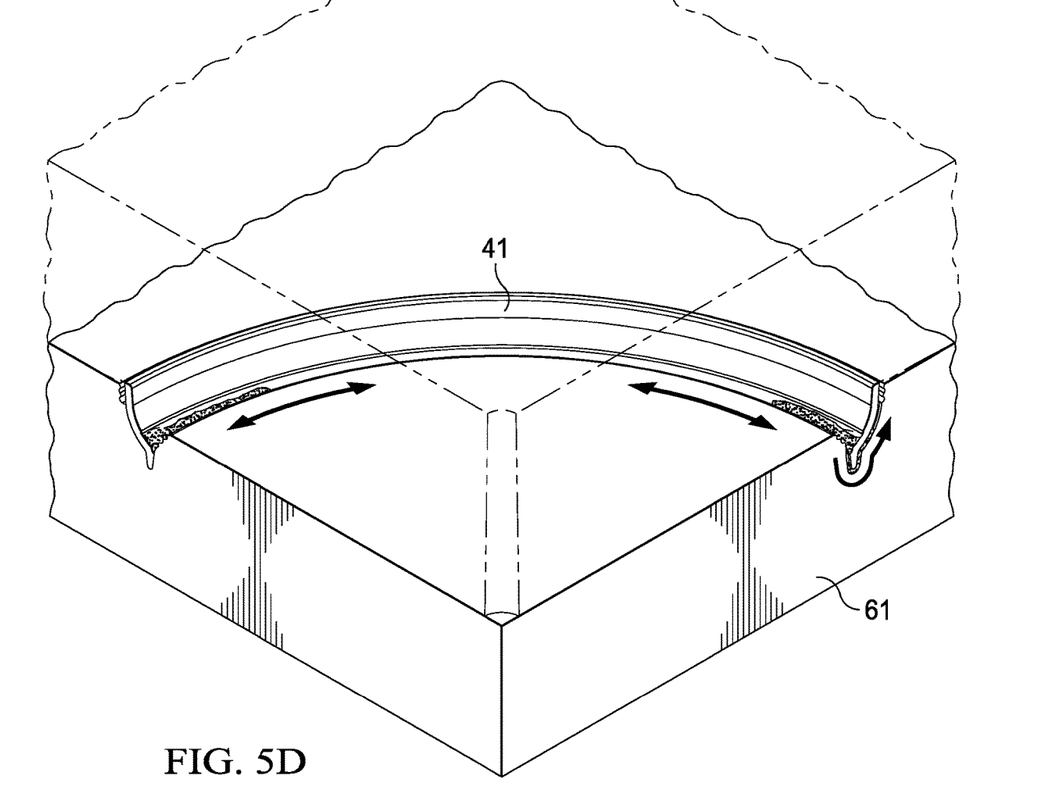
FIG. 5D is a continuation of the view of FIG. 5C, showing the TPV material flowing through the ribs of the mold cavity and around the top of the PP insert to form a portion of the external sealing portion of the gasket.

FIG. 5D then shows the rubber (TPV) passing through the ribs or runner regions of the mold, allowing it to pass to the outer ring cavity (illustrated schematically by the bottom curved arrow in FIG. 5D).

Figure 5E:
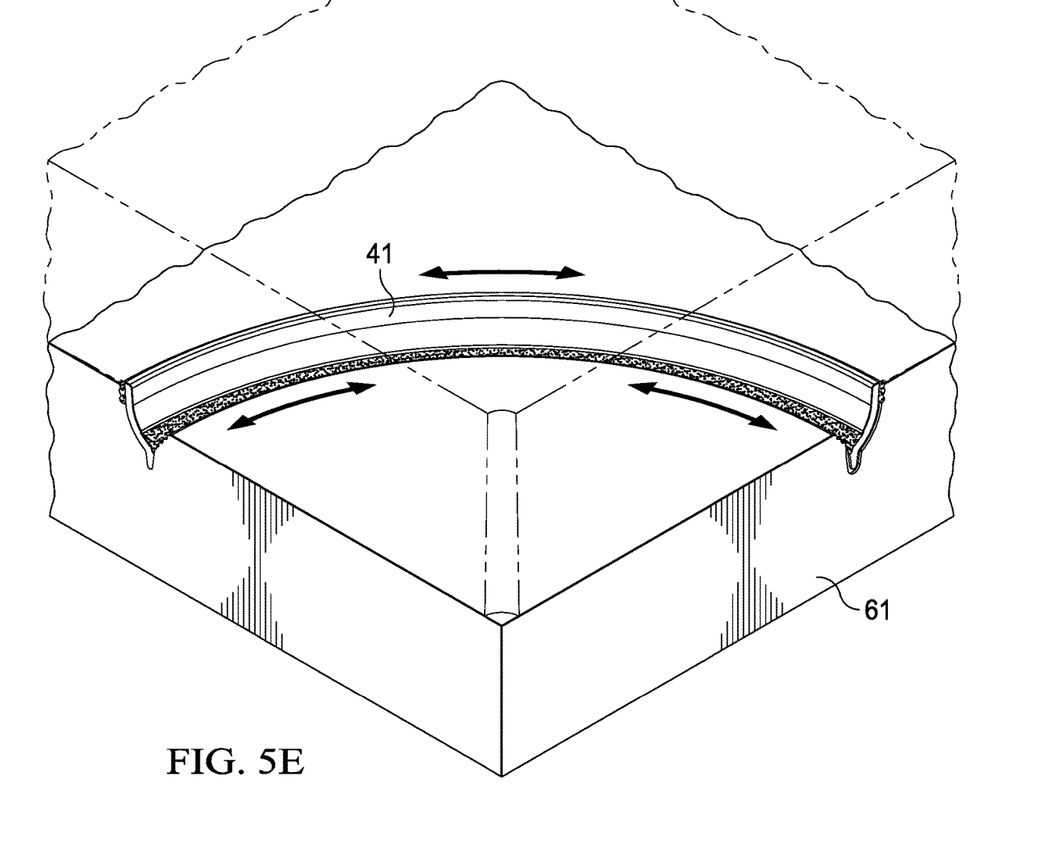
FIG. 5E is a continuation of the view of FIG. 5D showing the relative direction of movement of the TPV material in the mold.

As again illustrated in somewhat simplified fashion in FIG. 5E, the rubber continues to travel circumferentially in the inner and outer mold cavities until the melt fronts of the rubber meet.

Figure 5F:
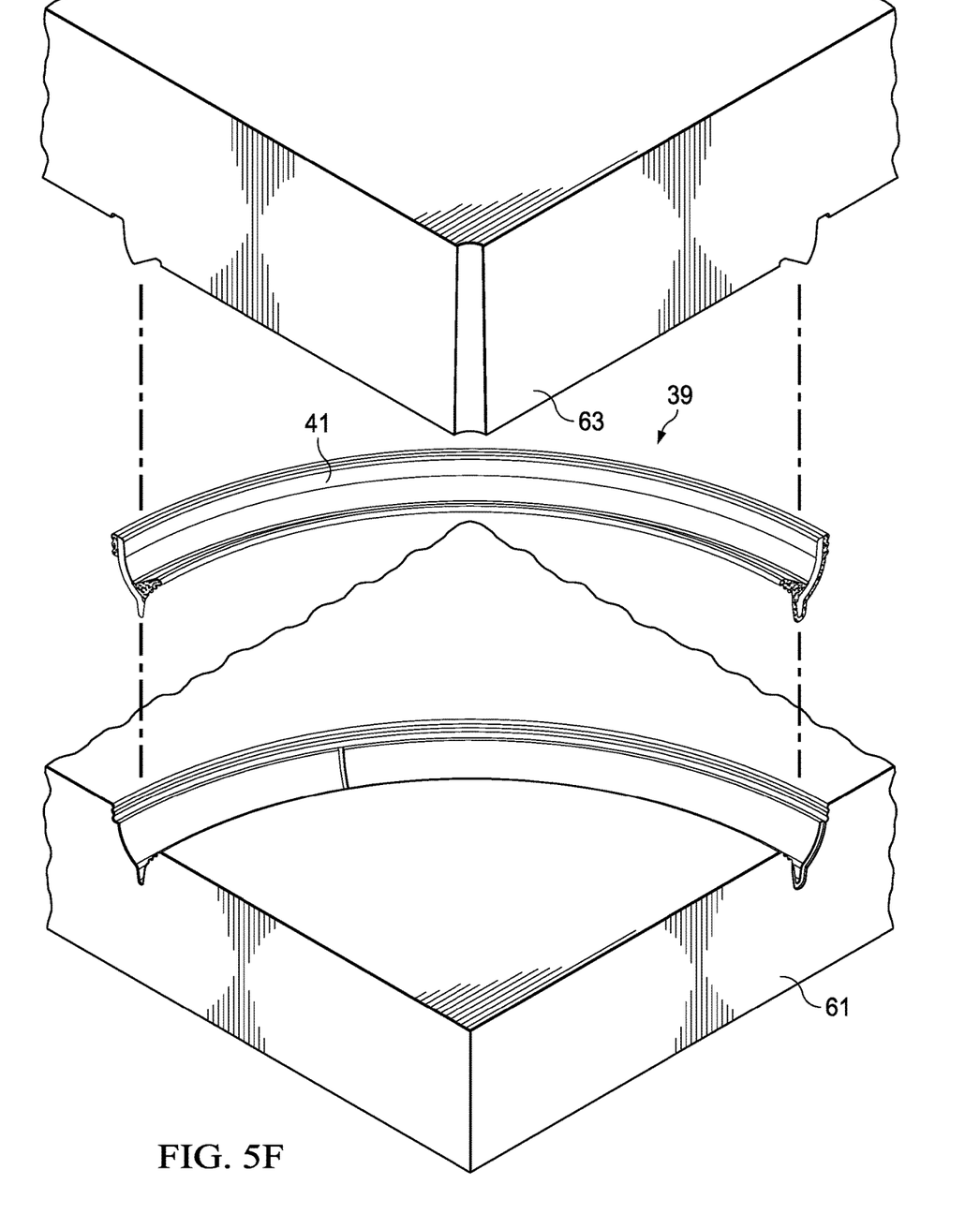
FIG. 5F shows the top half of the mold cavity being raised and the finished gasket of the invention being removed from the mold cavity.

FIG. 5F shows the mold halves 61, 63 being separated at the end of the molding operation and the completed gasket 39 being removed from the mold.

An invention has been provided with several advantages. The sealing gaskets of the invention are ideally suited for low pressure or non-pressure sealing operations due to the lightweight and minimalistic aspects of the design. The gaskets belong to the PP-TPE type family of gaskets and yet are manufactured using a minimum amount of TPE, thereby providing a resulting cost saving. In one preferred embodiment, the finished sealing gasket is approximately 55% PP and 45% TPE. The slender PP band supports the two separated rubber sealing surfaces and provides most of the necessary stiffness to develop adequate contact pressure against the sealing surfaces of the pipe joint (the bell raceway and the exterior of the mating male spigot). The outer sealing surface on the exterior of the pp band has just the appropriate size to function as a sealing body, while offering a material savings over the gaskets of the prior art. The unique sealing aspects of the gaskets of the invention are due, in part, to the fact that the contact pressure on the OD of the seal comes from the ring compression (interference) and from compression and bending of the PP body. The main source of contact pressure on the ID of the gasket comes from the circumferential stress of the stretched lip region of the gasket. The internal bending stress of the PP band is used as the means for transmitting reaction forces through the seal. The V-type seal shape of the gasket promotes self-energizing behavior when hydrostatic pressure is applied to the resulting pipe joint.

While the invention has been shown in only one of its forms, it is not thus limited but is susceptible to various changes and modifications without departing from the spirit thereof.

What is claimed is:

1. A pipe sealing gasket designed for receipt within a raceway provided within a female bell socket end of a thermoplastic pipe, the female bell socket end having a given internal diameter which is designed to receive a given outer diameter of a mating male thermoplastic pipe end to form a pipe joint, the gasket comprising:
    a hard plastic ring shaped band having an outer circumferential surface and an inner circumferential surface, and two separated elastomer portions, a first of the separated elastomer portions forming an outer ring which circumscribes the outer circumferential surface of the hard plastic band, and a second of the separated elastomer portions forming an inner lip which circumscribes the inner circumferential surface of the hard plastic band, the two separate elastomer portions being connected by a series of spaced ribs which form a continuous body of elastomer connecting the first and second separated elastomer portions at spaced intervals;
    and wherein the hard plastic band supports both the elastomer outer ring and the elastomer inner lip, providing adequate stiffness to develop contact pressure between the outer ring and the raceway of the bell socket end of the pipe and between the inner lip and the mating male pipe end.

2. The pipe sealing gasket of claim 1, wherein the hard plastic band is formed of a synthetic polyolefin.

3. The pipe sealing gasket of claim 2, wherein the hard plastic band is formed of polypropylene.

4. The pipe sealing gasket of claim 1, wherein the separated elastomer portions are both formed of thermoplastic elastomer.

5. The pipe sealing gasket of claim 1, wherein the gasket is comprised of greater than 50% synthetic polyolefin.

6. The pipe sealing gasket of claim 5, wherein the gasket is comprised of approximately 55% poly propylene and 45% thermoplastic elastomer by volume.

7. The pipe sealing gasket of claim 1, wherein the elastomer outer ring portion has an outer ring surface and is selectively sized to function as a sealing body, whereby contact pressure with the pipe belled end on the ring outer surface comes from ring compression due to interference with the pipe belled end and from bending of the polyolefin body, and wherein the elastomer inner lip portion and outer ring surface are sized to absorb any dimensional variation in the pipe male and female members.

8. The pipe sealing gasket of claim 7, wherein in the case of the elastomer inner lip portion, the main source of contact pressure comes from circumferential stress of the lip being stretched by the mating male pipe end as the pipe joint is made up.

9. The pipe sealing gasket of claim 1, wherein there is no direct compression line from the outer elastomer ring portion to the inner elastomer lip portion of the gasket through soft material but rather the internal bending stress of the hard plastic band is the means for transmitting reaction forces through the seal to the outer elastomer ring portion and the inner elastomer lip portion.

10. The pipe sealing gasket of claim 1, wherein the hard plastic band, together with the supported outer elastomer ring portion and inner elastomer lip portion form a V-shaped profile in cross section, the V-shape itself acting to promote a self-energizing behavior when hydrostatic pressure is applied to the pipe joint.

11. The pipe sealing gasket of claim 1, wherein both the elastomer outer ring portion and the elastomer inner lip portion of the gasket have exposed circumferential sealing surfaces, both of which are provided with a series of circumferential lands and grooves for engaging the female pipe socket end and the mating male pipe as the pipe joint is made up.

12. A method of manufacturing a pipe sealing gasket designed for receipt within a raceway provided within a female bell socket end of a thermoplastic pipe, where the female bell socket end has a given internal diameter which is designed to receive a given outer diameter of a mating male thermoplastic pipe end to form a pipe joint, the method comprising the steps of:

providing an injection mold having a top half and a bottom half, the bottom half having a rubber mold cavity;

placing a hard plastic band within the rubber mold cavity, the hard plastic band having an inner circumferential surface and an outer circumferential surface;

injecting rubber into the mold so that the rubber flows on both sides of the hard plastic band, thereby creating an outer, raceway sealing surface and an inner spigot sealing surface, the two surfaces being separated from one another except for the presence of a series of spaced ribs located at spaced apart circumferential locations on the hard plastic band.

13. The method of claim 12, wherein the rubber is a TPV rubber.

14. The method of claim 12, wherein the hard plastic band is formed of a polyolefin.

15. The method of claim 14, wherein the hard plastic band is polypropylene.

16. A method of manufacturing a pipe sealing gasket designed for receipt within a raceway provided within a female bell socket end of a thermoplastic pipe, where the female bell socket end has a given internal diameter which is designed to receive a given outer diameter of a mating male thermoplastic pipe end to form a pipe joint, the method comprising the steps of:

providing an injection mold having a top half and a bottom half, the bottom half having a rubber mold cavity, the mold cavity having a series of circumferentially spaced rib-shaped spaces;

placing a hard plastic band within the rubber mold cavity, the hard plastic band having an inner circumferential surface and an outer circumferential surface;

injecting rubber into the mold so that the rubber flows on both sides of the hard plastic band through the series of circumferentially spaced rib-spaced spaces, thereby creating an outer, raceway sealing surface and an inner spigot sealing surface, the two surfaces being separated from one another except for the presence of a series of spaced ribs formed in the rib-shaped spaces as a result of the molding operation, thereby forming the pipe sealing gasket;

wherein the resulting pipe sealing gasket has two separated elastomer portions, a first of the separated elastomer portions forming an outer ring which circumscribes the outer circumferential surface of the hard plastic band, and a second of the separated elastomer portions forming an inner lip which circumscribes the inner circumferential surface of the hard plastic band, the two separate elastomer portions being connected by the series of spaced ribs which form a narrow continuous body of elastomer connecting the first and second separated elastomer portions at spaced intervals.

17. The method of claim 16, wherein the hard plastic band supports both the elastomer outer ring and the elastomer inner lip, providing adequate stiffness to develop contact pressure between the outer ring and the raceway of the bell socket end of the pipe and between the inner lip and the mating male pipe end.

18. The method of claim 17, wherein the hard plastic ring is formed of polypropylene.

19. The method of claim 17, wherein the separated elastomer portions are both formed of thermoplastic elastomer.

20. The method of claim 17, wherein the resulting sealing gasket is comprised of greater than 50% synthetic polyolefin.

21. The method of claim 17, wherein the resulting elastomer outer ring portion has an outer ring surface and is selectively sized to function as a sealing body, whereby during the assembly of a pipe joint, contact pressure with the pipe belled end on the ring outer surface comes from ring bending and compression due to interference with the pipe belled end and from bending of the polyolefin body, and wherein the elastomer inner lip portion and outer ring portion are sized to absorb any dimensional variation in the pipe male and female members.

22. The method of claim 17, wherein in the case of the elastomer inner lip portion, the main source of contact pressure comes from circumferential stress of the lip being stretched by the mating male pipe end as the pipe joint is made up.

23. The method of claim 17, wherein in the finished sealing gasket, there is no direct compression line from the outer elastomer ring portion to the inner elastomer lip portion of the gasket through soft material, but rather the internal bending stress of the hard plastic ring portion is the means for transmitting reaction forces through the seal to the outer elastomer ring portion and the inner elastomer lip portion.

* * * * *